(12) United States Patent
Persson et al.

(10) Patent No.: US 6,823,193 B1
(45) Date of Patent: Nov. 23, 2004

(54) DOWNLINK TRANSMIT POWER SYNCHRONIZATION DURING DIVERSITY COMMUNICATION WITH A MOBILE STATION

(75) Inventors: Magnus Persson, Sollentuna (SE); Gert-Jan van Lieshout, Apeldoorn (SE); Eddie Corbett, Stockholm (SE); Andreas Andersson, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/514,145

(22) Filed: Feb. 28, 2000

(51) Int. Cl.$^7$ .......................... H04B 7/00; H04B 7/185; H04Q 7/20
(52) U.S. Cl. .......................... 455/522; 455/442; 455/436; 370/318
(58) Field of Search .............................. 455/522, 442, 455/69, 430, 436, 437, 67.3; 370/331, 332, 317, 318, 320

(56) References Cited

U.S. PATENT DOCUMENTS

| | | |
|---|---|---|
| 5,056,109 A | 10/1991 | Gilhousen et al. |
| 5,107,487 A | 4/1992 | Vilmur et al. |
| 5,267,262 A | 11/1993 | Wheatley, III |
| 5,430,760 A | 7/1995 | Dent |

(List continued on next page.)

FOREIGN PATENT DOCUMENTS

| | | |
|---|---|---|
| EP | 0 680 160 A | 11/1995 |
| EP | 0 682 419 | 11/1995 |
| EP | 0 802 638 A | 10/1997 |
| EP | 0 809 365 A | 11/1997 |
| EP | 0 940 930 A | 9/1999 |
| WO | 97/02665 | 1/1997 |
| WO | 97/26716 | 7/1997 |
| WO | WO 98/56120 | 12/1998 |
| WO | 98/56200 A | 12/1998 |
| WO | 99/08398 | 2/1999 |
| WO | 99/31819 A | 6/1999 |
| WO | 99/52310 A | 10/1999 |
| WO | 99/53630 A | 10/1999 |

OTHER PUBLICATIONS

A. Salmasi et al.: "On the System Design Aspects of Code Division Multiple Access (CDMA) Applied to Digital Cellular and Personal Communications Networks," Gateway to the Future—Technology in Motion, St. Louis, May 19–22, 1991, No. Conf. 41, May 19, 1991, pp. 57–62, XP000260154, Institute of Electrical and Electronics Engineers.

(List continued on next page.)

Primary Examiner—Vivian Chin
Assistant Examiner—Raymond Persino
(74) Attorney, Agent, or Firm—Nixon & Vanderhye P.C.

(57) ABSTRACT

The downlink transmit powers of base stations involved in a diversity handover communication with a mobile station are controlled to minimize base station power "drift." A downlink reference power level is determined based on detected, current transmit power levels of the diversity handover base stations. One or more power offsets is determined for one or more of the base stations based on signal quality measurements made by the mobile station. The reference power level and power offset(s) are used to selectively regulate an adjustment to the transmit power levels of the diversity handover base stations. The general reference power is transmitted at a first, relatively high frequency to the diversity handover base stations by embedding it in a user data frame. In that way, the signal processing load is kept to a minimum despite the higher transmission rate. Individual power offsets are sent to associated individual base stations in a control signalling channel identifying the one base station at a second frequency lower than the first frequency. The control channel signaling permits individual base station power offsets, but the lower frequency at which the offsets are transmitted reduces the associated signaling load.

27 Claims, 6 Drawing Sheets

U.S. PATENT DOCUMENTS

| | | | |
|---|---|---|---|
| 5,491,837 A | | 2/1996 | Haartsen |
| 5,551,057 A | | 8/1996 | Mitra |
| 5,574,982 A | | 11/1996 | Almgren et al. |
| 5,604,730 A | | 2/1997 | Tiedemann, Jr. |
| 5,710,982 A | | 1/1998 | Laborde et al. |
| 5,715,526 A | | 2/1998 | Weaver, Jr. et al. |
| 5,771,451 A | * | 6/1998 | Takai et al. ............ 455/442 |
| 5,799,005 A | | 8/1998 | Soliman |
| 5,893,035 A | | 4/1999 | Chen |
| 6,085,108 A | * | 7/2000 | Knutsson et al. ......... 455/522 |
| 6,144,861 A | * | 11/2000 | Sundelin et al. ......... 455/522 |
| 6,259,927 B1 | * | 7/2001 | Butovitsch et al. ....... 455/522 |
| 6,337,985 B1 | * | 1/2002 | Roux et al. ............ 455/442 |
| 6,473,624 B1 | * | 10/2002 | Corbett et al. .......... 455/522 |
| 6,493,541 B1 | * | 12/2002 | Gunnarsson et al. ....... 455/69 |
| 6,553,016 B1 | * | 4/2003 | Roxbergh ............... 370/331 |
| 6,708,041 B1 | * | 3/2004 | Butovitsch et al. ....... 455/522 |

OTHER PUBLICATIONS

Power Control under Soft Handover, FPLMTS Study Committee, Air–interface WG, SWG2, Document No. AIF/SWG2–16–18 (P), Matsushita Communication Industrial Co., Ltd., Mar. 30, 1998.

Power Control under Soft Handover, FPLMTS Study Committee, Air–interface WG, SWG2, Document No. AIF/SWG2–15–2 (C), Matsushita Communication Industrial Co., Ltd., Mar. 11, 1998.

Excerpt from TIA/EIA Interim Standard Mobile StationBase Station Compatibility Standard for Dual–Mode Wideband Spread Spectrum Cellular System, TIA/EIA/IS–95, Jul. 1993.

TSG–RAN Working Group 1 meeting #7bis, Kyongju, Korea, Oct. 4–5, 1999 entitled: Adjustment Loop in downlink power control during soft handover.

A Solution to the Power Drifting Problem in DHO, Oscar Salonaho, Nokia Research Center.

Derwent Abstract No. 95–384440, 1998, Transmission Power Control Method for CDMA System Reducing Transmission Power Quickly To Prevent Interference With Other Mobile Stations, e.g. Due to Change in Buildings Surrounding Mobile Station.

L. Song et al., Lucent Technologies, Adaptive Power Control Step Size, 1998.

* cited by examiner

SLOW DOWNLINK TRANSMIT POWER CONTROL

DOWNLINK POWER CONTROL
REQUEST MESSAGE IN CONTROL PLANE

DOWNLINK TRANSMIT POWER SYNCHRONIZATION DURING DIVERSITY COMMUNICATION WITH A MOBILE STATION

FIELD OF THE INVENTION

This invention relates to the control of power levels of transmitted signals in telecommunication systems, such as spread spectrum multiple access systems. In particular, it relates to control of transmit power levels of base stations involved in diversity communication with a mobile station.

BACKGROUND AND SUMMARY OF THE INVENTION

Transmit power control is important to communication systems having many simultaneous transmitters to reduce the mutual interference of such transmitters. It is particularly important in communication systems that use code division multiple access (CDMA) to obtain high system capacity. Power control is important for the uplink, i.e., for transmissions from a mobile station to the radio network including several base stations, and for the downlink, i.e., for transmissions from one or more base stations to a mobile station.

Uplink power control may be provided by a closed-loop method where a base station measures the strength of a signal received from a mobile station and then periodically transmits one transmit power control (TPC) bit to the mobile station every certain time period, e.g., 1.25 milliseconds. Based on the received power control bit, the mobile station increases or decreases its transmit (uplink) power by a predetermined amount. On the downlink, one power control approach is for the mobile terminal to measure a received downlink power level from a base station and report the measurement back to the base station, which might adjust its transmit power in predetermined circumstances.

Downlink power control in a system compliant with the IS-95-A standard is based on frame error rate (FER) measurements by the mobile station, which sends FER reports to the system. Sections 6.6.4.1.1 and 7.6.4.1.1 of the IS-95-A standard note that such FER reports can be sent when a threshold has been crossed and/or periodically. Typically, an FER report may be sent every 1–5 seconds. One problem with this method is that it can take a long time (i.e., several seconds) to accumulate the appropriate FER statistics. As a result, Rayleigh fading and shadow fading are not tracked. In fact, the IS-95-A method has proved to be so slow that it is usually does not provide much added benefit compared to not using downlink power control.

Some personal communications systems (PCS) using CDMA are similar to the cellular IS-95 standard in that the mobile station reports downlink frame errors whenever they occur. This puts the radio network in control of frame errors, but it still takes a long time to accumulate the appropriate statistics. In other communication system concepts like the UMTS Code Division Testbed (CODIT), the signal quality is determined by estimating the raw bit error rate (BER) instead of the FER. Hence, good statistics can be obtained faster, and a mobile station sends BER reports to the network more often (i.e., 1–10 times per second). System performance is improved in comparison to a system using downlink transmit power control according to the IS-95-A standard, but the CODIT method is still too slow to handle Rayleigh fading.

The mobile terminal may also measure the downlink signal-to-interference ratio (SIR) of the signal received from the base station and transmit an appropriate power control command on the uplink back to the base station. Each power control command may be an uncoded, single bit in order to minimize signalling overhead. Assuming a smaller frame length than that of IS-95-A, a bit rate of several hundred kilobits per second, a wider channel bandwidth of 5 MHZ, and a CDMA chip rate of four million chips per second, such a downlink power control approach tracks Rayleigh fading fairly well.

The situation is more complicated if the mobile terminal is in a "soft" diversity handover mode. Soft handover is also called macrodiversity and describes a situation where the mobile terminal communicates with two or more base stations simultaneously. Soft handover is described in U.S. Pat. No. 5,109,528 to Uddenfeldt and U.S. Pat. No. 5,327,577 to Uddenfeldt, both of which are incorporated here by reference.

When the mobile terminal is not in soft handover mode, the error rate of the uncoded power control commands should be small, e.g., about one percent, in normal transmission conditions. But the error rate of the uncoded downlink power control commands becomes a more serious problem when the mobile terminal is in soft handover. Because there are different paths or links between the mobile station and each of the handover base stations, and different conditions affect each of those paths, the errors impacting those commands vary across the radio links. These errors are typically independent so that different errors will likely differently impact the same command sent to each base station involved in the soft handover. A large number, e.g., 1500, of power control commands per second may be sent to two base stations involved in a soft handover in order to track rapid channels changes, e.g., Rayleigh fading. The result is that the average transmit powers of each of the base stations involved in the diversity handover may "drift" apart from where they should be. As a result, the commanded transmit power levels of the base stations drift apart to suboptimal levels from a system-capacity point of view.

The lost capacity occurs because at least one of the base stations in communication with a mobile station in soft handover mode will transmit at a power level that is too high. The magnitude of the difference between one downlink power level and another downlink power level affects the system's capacity because one base station's transmissions look like interference to other base stations. In addition, the rate that each downlink power level drifts is important because faster rates usually require the control commands to be issued more frequently. Higher frequency control commands generally increase the messaging load that must be carried by the control links between the base stations BS1, BS2 and the RNC.

Several ways to combat base station power drift include reducing the probability of transmit power control command errors by sending fewer such commands, increasing bit redundancy of the transmit power commands, or reducing the size of the power adjustment made at the bast station in response to each command. Unfortunately, all of these approaches are not completely satisfactory because rapid changes in the radio channels are not tracked.

Alternatively, the power drift may be reduced by increasing control signaling between the base stations via one or more radio network control nodes to synchronize the downlink transmit powers of those base stations. Namely, the power transmission level of each base station in the diversity handover is compared to a power reference or threshold common to all the base stations in the diversity handover.

The difference between the transmit power of each base station and the reference power is used to correct the transmit power level of that base station. Because the power correction depends on the difference between the actual transmit power at the base station and the common reference power, the various transmit powers of the different base stations in the diversity handover converge relatively quickly. Thus, even if the transmit power command from the mobile station is received in error in one or more of the base stations, the power correction based on the comparison to the common reference power compensates for such errors.

A disadvantage with this alternative is the increase in control signaling. This becomes even more of a problem the more frequently the reference power is updated. However, more frequent updates are desirable to track rapid channel changes.

Another problem with this alternative is that updating a single reference power for all the soft handover base stations does not permit the flexibility to set different diversity handover power references for different base stations. For example, it may be desirable to set the reference power of a dominant or favored base station to a higher value than the other base stations involved in the diversity handover.

The above problems are overcome by the present invention. It is an object of the present invention to provide both effective and flexible power control of the base stations involved in a macrodiversity transmission to a particular mobile station to minimize base station drift. It is a further object of the present invention to reduce signalling requirements between base stations involved in a macrodiversity transmission and a radio network control node when adjusting the transmit power levels of the base stations.

In the present invention, the downlink transmit powers of base stations involved in a diversity handover are controlled to minimize base station power "drift." A single reference power level is determined based on detected transmit power levels of the base stations. A power offset is determined for one or more of the base stations based on signal quality measurements made by the mobile station. The reference power level and the power offset are used to regulate an adjustment to the respective transmit power levels of the base stations for the diversity handover communication. The reference power is embedded in the user data stream and transmitted at a relatively high frequency to all of the base stations in the diversity handover. The high frequency transmission of adjusted reference power from the radio network control node to the diversity handover base stations tracks rapid channel fluctuations and compensates for independent errors in frequently transmit power control (TPC) commands from the mobile station. In other words, the high frequency reference power adjustment minimizes the "drift" between base station transmit powers. By embedding the adjusted reference power in the user data stream, the associated signalling load is kept to a minimum.

Flexibility in reference power setting is achieved using a companion procedure. Individual power "offsets" from the frequently broadcast power reference are sent to associated individual base stations using selective signalling over a control channel. Control channel signalling, although more "costly" in terms of signalling overhead, allows a single base station to be directed with individual commands. Added signal processing overhead is kept to a minimum because the offsets are transmitted from the radio network control node at a lower frequency than the higher frequency at which the reference power is adjusted. The control signaling permits individual addressing of the control frame to a specific base station or radio link rather than to all of the base stations or radio links involved in the diversity handover.

The lower frequency, companion procedure provides the flexibility of setting different transmit power levels for different base stations involved in the diversity handover using different offsets from the general reference power level established by the fast base station power synchronization procedure. This flexibility may be desirable in situations where one of the base stations is a favored or dominant base station in the communication. For example, the favored or dominant base station may transmit at a higher power level, while less favored/dominant base stations are set to transmit at lower power levels to reduce unnecessary interference, but still obtain the benefits associated with diversity handover.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not necessarily to scale, emphasis instead being placed upon illustrating the principles of the invention.

DETAILED DESCRIPTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. In other instances, detailer descriptions of well known methods, interfaces, devices and signaling techniques are omitted so as not to obscure the description of the present invention with unnecessary detail.

Figure 1:
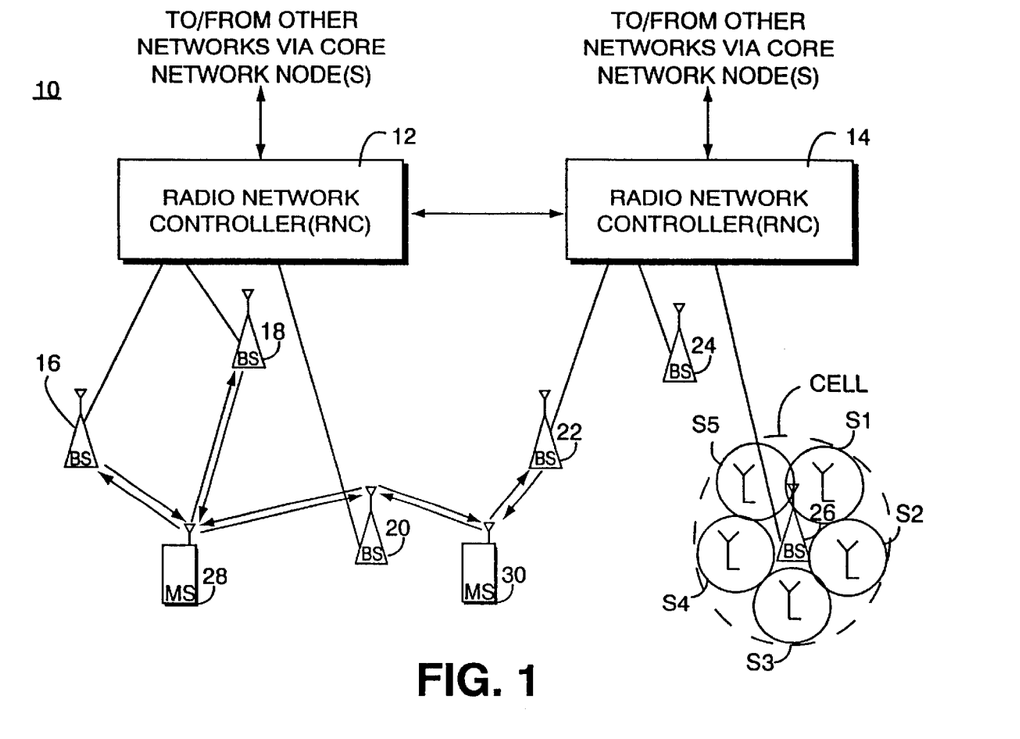
FIG. 1 is a high level diagram of an example communication system in which the present invention may be employed.

A mobile radio cellular communications system 10 is shown in FIG. 1 and may be, for example, a CDMA or a wideband CDMA communications system. Radio network controllers (RNCs) 12 and 14 control various radio network functions including for example radio access bearer setup, diversity handover, etc. More generally, each RNC network controller 12 is coupled to a plurality of base stations 16, 18, and 20. Radio network controller 14 is coupled to base stations 22, 24, and 26. Each base station serves a geographical area referred to as a cell, and a cell may be divided into plural sectors. Base station 26 is shown as having five antenna sectors S1-S5. Each sector also has a corresponding cell area so that in this situation the base station serves five cells. The base stations are coupled to their corresponding radio network controller by a digital time established via dedicated telephone lines, optical fiber links, microwave links, etc. Both radio network controllers 12 and 14 are connected with external networks such as the Public Switched Telephone Network (PSTN), the Internet, etc. through one or more core network nodes like a mobile switching center (not shown) and/or a packet radio service node (not shown).

In FIG. 1, two mobile stations 28 and 30 are shown communicating with plural base stations in diversity handover situations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between the mobile station and a base station has an uplink component and a downlink component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

Figure 2:
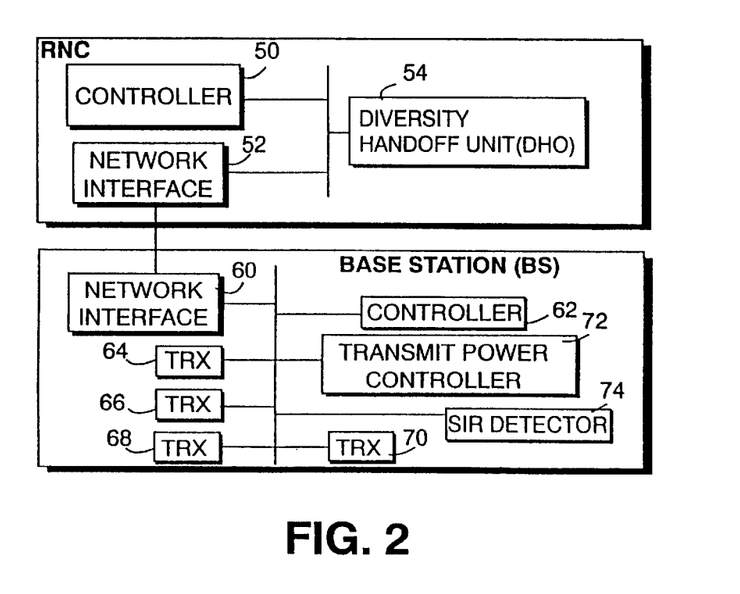
FIG. 2 is a function block diagram of radio network controller in a base station illustrated in FIG. 1.

Some additional details of a base station and a radio network controller are now provided in conjunction with FIG. 2. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs functions required for establishing, maintaining, and dropping diversity connections such as diversity combining, diversity splitting, power control and other link related radio resource control algorithms. The RNC may include other control/functional units not necessary to the understanding of the invention.

Each base station (BS) includes a corresponding network interface 60 for interfacing with the RNC. In addition, the base station includes a controller 62 connected to a one or more transceivers. In this example, a plurality of transceivers (TRX) 64, 66, 68, and 70 are shown coupled to a transmit power controller 72. Controller 62 controls the overall operation of the base station as well as the establishment, maintenance, and release of radio connections. Representative transceivers 64–70 are individually assigned to specific communications with mobile stations. At least one transceiver is employed as a common control channel over which the base station transmits common signaling such as pilot, synchronization, or other broadcast signaling. Mobile stations within or near that base station's cell(s) monitor the common channel. Transmit power controller 72 performs power control operations based on messages received from the RNC and from mobile stations. One or more signal-to-interference ratio (SIR) detectors 74 (only one is shown for purposes of illustration) may be used to detect the SIR of signals received from mobile stations. Other signal quality detectors may be employed, e.g., CIR ($E_c/I_o$), RSSI, etc.

Figure 3:
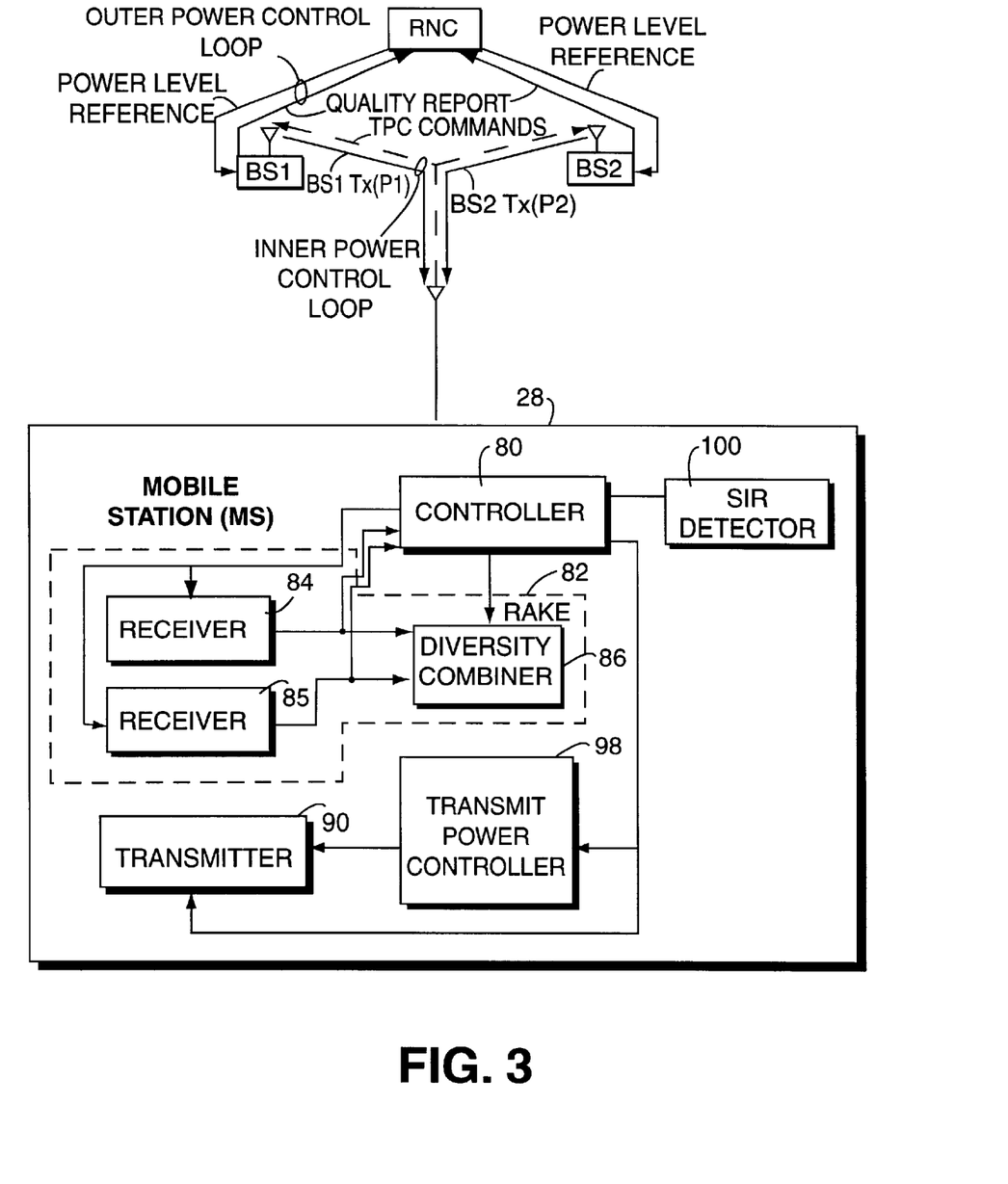
FIG. 3 is a function block diagram illustrating a mobile station shown in FIG. 1, as well as inner and outer power control loops in a mobile communications system.

FIG. 3 illustrates additional details of the mobile station 28 shown in FIG. 2. The mobile station 28 includes a controller 80 connected to a RAKE receiver 82, a transmit power controller 88, a transmitter 90, and a SIR (or other signal quality) detector 100. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combined in diversity combiner 86, and processed as one signal. Transmit power controller 88 determines the transmit power level (e.g., as a signal-to-interference ratio (SIR)) of the received, diversity-combined signal.

FIG. 3 also shows two power control loops: an inner power control loop between the mobile station and two base stations BS1 and BS2 and an outer power control loop between the two base stations and the RNC. Based upon signal quality, e.g., SIR, measurements of a received signal, the mobile station generates a transmit power control command and sends it to the base stations BS1 and BS2. Similarly, the base stations 1 and 2 send transmit power control commands to the mobile station based on SIR measurements made of signals received from that mobile station. The TPC commands may include one or more bits which indicate a desired increase in transmit power, a desired decrease in transmit power, or in some cases no change in transmit power. Of course, any number of bits or bit assignments is possible. In order to compensate for rapidly changing transmission conditions, these transmit power control commands are sent very frequently, and in one example embodiment, every 0.667 millisecond time slot or 1,500 times a second. In the outer control loop, the RNC monitors signal quality reports provided from the base stations, including SIR values detected by the mobile station for signals received from both base stations (BS1 and BS2), as well as the actual transmit power levels of the base station transmission to the mobile station.

In one aspect of the present invention, referred to below as the "fast" downlink transmit power synchronization procedure, the radio control node controller determines respective transmit power levels of each base station involved in a diversity handover communication with a mobile station. The transmit power controller in each diversity handover base station regularly forwards to the radio network controller a current transmit power level associated with the diversity handover communication. Each base station also forwards a signal strength or quality measurement or indicator received from the mobile station associated with transmitted signals from that base station to the mobile station in the diversity handover communication. A reference power level is determined by the RNC controller based on one or more of the determined transmit power levels. That reference power level is then used to regularly adjust the respective power levels of the base stations for the diversity handover communication. More specifically, a difference is calculated between the reference power level and the current transmit power level, and that difference is used to calculate a correction value. The current transmit power level of the base station is adjusted using the correction value.

Figure 4A:
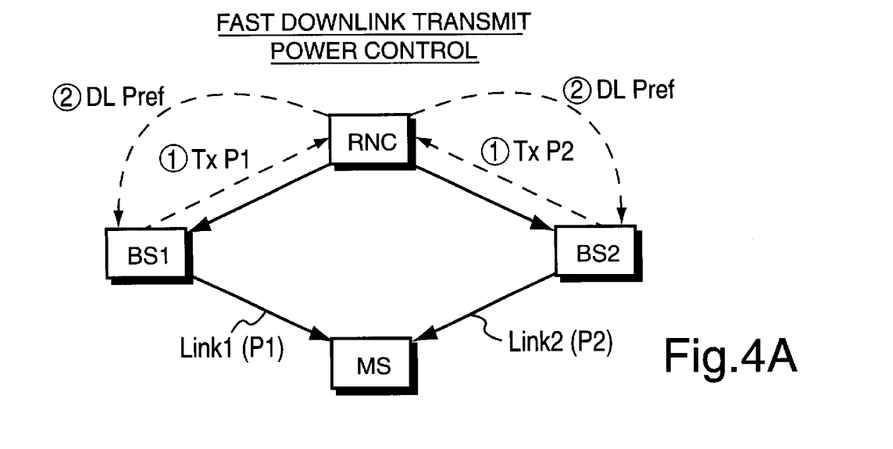
FIG. 4A shows a "fast" downlink transmit power control diagram for two base stations involved in a diversity handover.
Figure 4B:
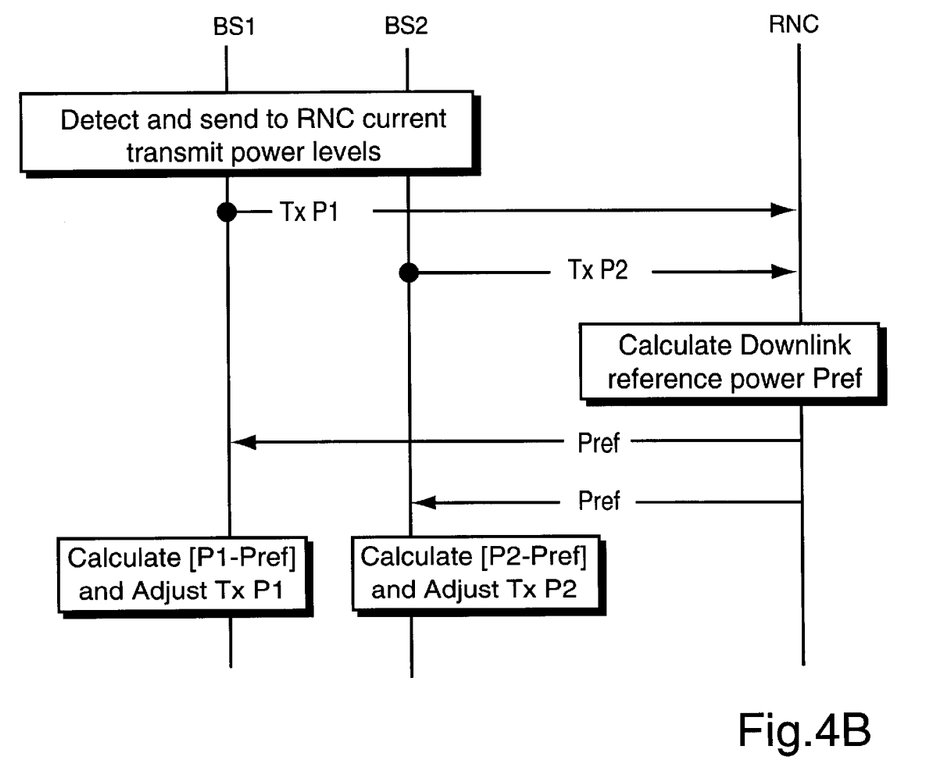
FIG. 4B is a signaling flow describing the signals shown in FIG. 4A.

The present invention will be better understood in the context of a simple diversity handover communication situation in which a mobile station is communicating with two base stations BS1 and BS2. Of course, the present invention may be applied in diversity handover situations including more than two base stations. FIG. 4A shows a "fast" downlink transmit power synchronization loop used to combat base station transmit power drift (between BS1 and BS2) in a diversity handover communication with the mobile station (MS) via associated radio links (Link1 and Link2). FIG. 4B illustrates the operations and signaling at each node shown in FIG. 4A.

First, the base stations BS1 and BS2 detect and send to the RNC their current transmit power levels TxP1 and TxP2, respectively. The RNC uses the base station transmit power levels to calculate a downlink power reference value (DL Pref) for the diversity handover communication. Second, the RNC sends that Pref to the diversity handover base stations, and each base station then calculates an appropriate transmit power adjustment by calculating the difference between its current transmit power and the reference power, e.g., [P1−Pref]. That difference is used to adjust the transmit power towards the reference power.

That power reference value may be calculated in a variety of ways. For example, the RNC may set Pref to the average or arithmetic mean of TxP1 and TxP2 over a certain period of time. Another example would be to set the reference to the lowest of the base station transmit powers or the greatest of the base station powers. The power level adjustments typically should be made frequently enough to maintain the drift between the downlink transmit power levels of the diversity handover base stations to a low level, e.g., less than 1 dB.

Preferably, the reference power is transmitted to the diversity handover base stations at a relatively high frequency, e.g., several, ten, or more times a second, to permit tracking of rapid radio channel changes and to compensate for independent bit errors affecting the transmit power control commands sent from the mobile station to the base station at high frequency, e.g., 1500 times/seconds. To minimize excessive signaling associated with such frequent reference power transmissions, a reference power update is included in a single control frame embedded in the user data stream transmitted to each of the diversity handover base stations. Because the user data connection is already established between the diversity handover base stations and the RNC, there is no additional setup signalling needed. Nor are specific base station addresses or identifiers required for this control frame because the same reference power is transmitted to all of the diversity handover base stations.

Figure 4C:
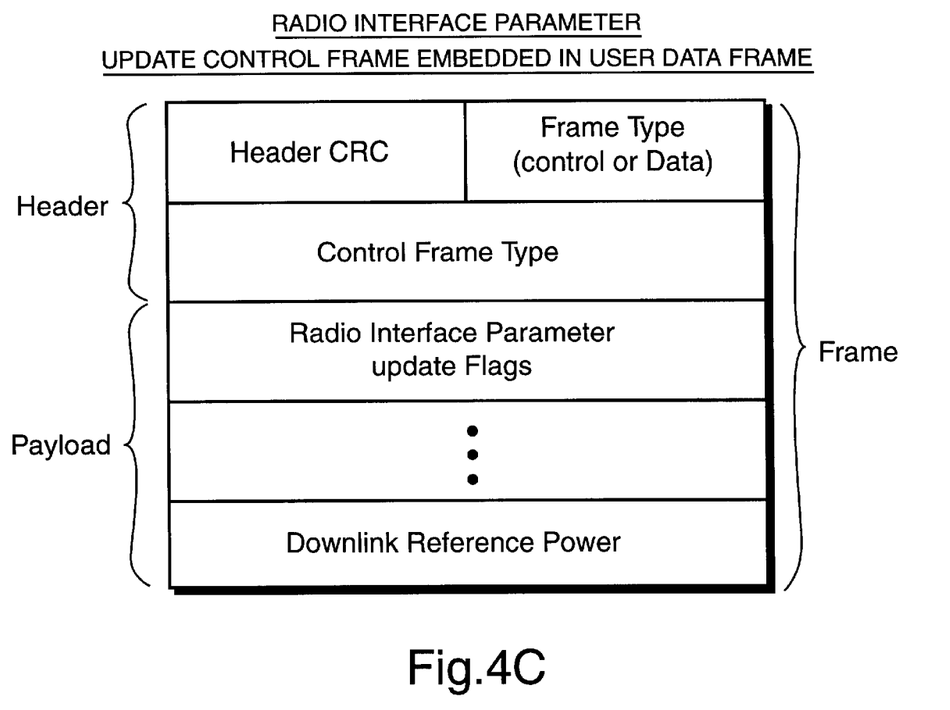
FIG. 4C shows an example control frame that may be embedded in a user data stream.

FIG. 4C shows a simplified, non-limiting example of a control frame with the downlink reference power embedded in a user data stream being considered for a third generation cellular system. Specifically, FIG. 4C shows a radio interface parameter update control frame including a header portion and a payload portion. The header includes CRC error detection bits, a frame type bit to indicate whether this frame is a user data frame or a control frame, and a control frame type field that includes a particular pattern of bits corresponding with a particular type of control frame. The payload includes radio interface parameter update flags that indicate the type of data structure(s) in the payload. One of the items to be included in the payload in accordance with this example embodiment of the invention is the downlink, diversity handover reference power value calculated by the RNC.

Thus, the "fast" base station transmit power synchronization procedure described above achieves the objective of a low signalling load procedure that reduces base station drift despite rapid channel changes and high frequency transmit power control commands from the mobile station susceptible to independent bit errors. However, this procedure, by itself, does not allow diversity handover base stations to transmit at different reference powers. Updating a single reference power for all the soft handover base stations does not permit flexibility to set different power references for different base stations. For example, it may be desirable to set the reference power of a dominant or favored base station to a higher value than the other base stations involved in the diversity handover.

Accordingly, another aspect of the present invention is a "slow" (lower frequency) companion procedure that permits setting different transmit power levels for different base stations involved in the diversity handover. Specifically, this "slow" procedure provides flexibility in power setting using different power offsets from a general reference power level established by the "fast" base station power synchronization procedure. Again, such flexibility may be desirable in situations where one of the base stations is a favored or dominant base station in the communication. The favored or dominant base station may transmit at a higher power level, while less favored/dominant base stations are set to transmit at lower power levels to reduce unnecessary interference, but still obtain the benefits associated with diversity handover.

Figure 5A:
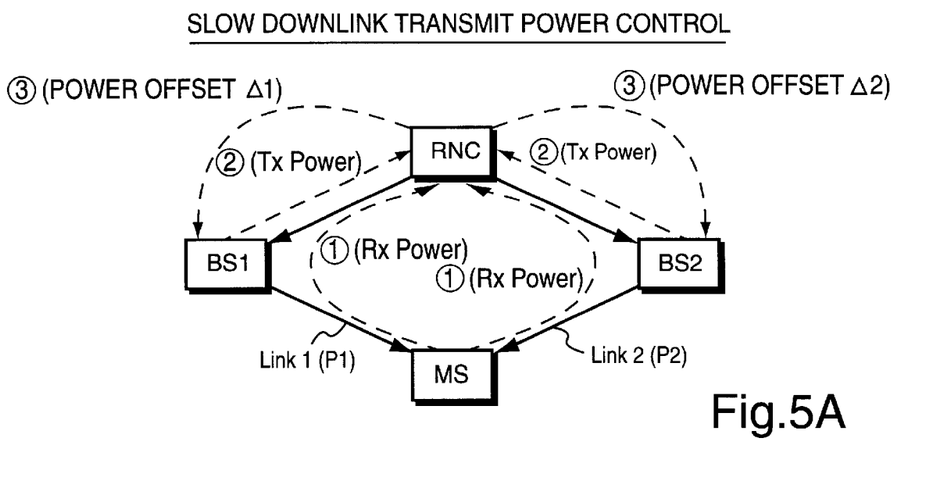
FIG. 5A shows a "slow" downlink transmit power control diagram for two base stations involved in a diversity handover.
Figure 5B:
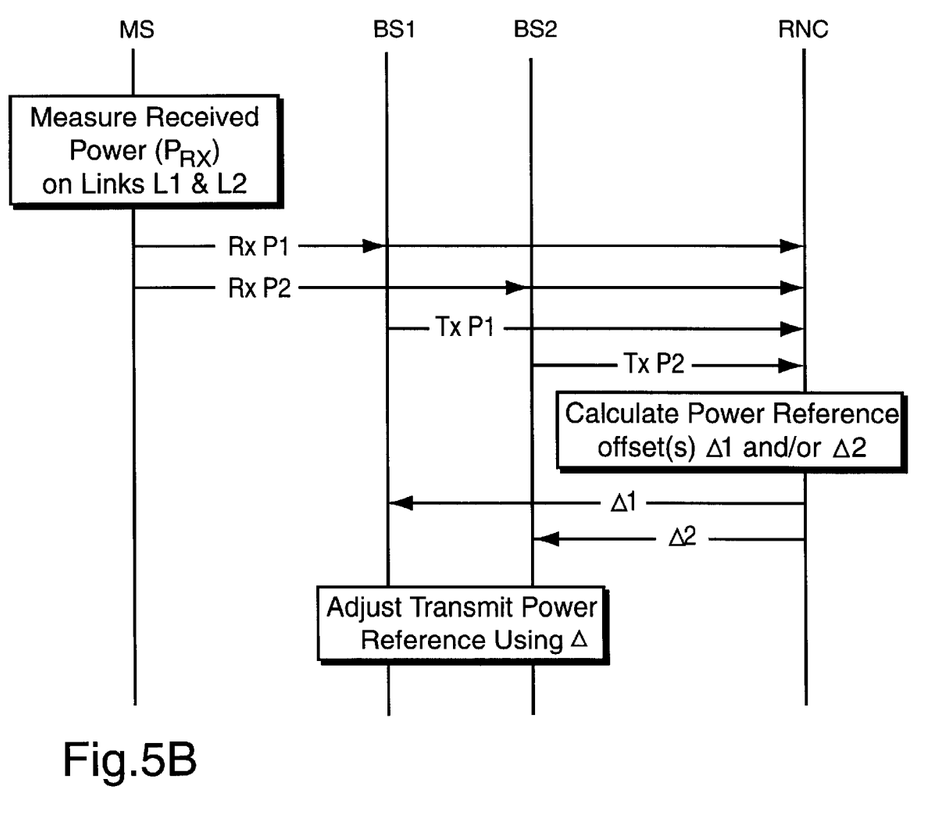
FIG. 5B is a signaling flow describing the signals shown in FIG. 5A.

FIGS. 5A and 5B illustrate the "slow" downlink transmit power control companion procedure. It should be understood that the terms "fast" and "slow" are merely employed as identifying labels rather than as absolute terms or even as descriptors of each procedure. In fact, either procedure may be employed with higher or lower frequency depending on system needs and capabilities.

First, the mobile station measures the quality of signals received from each of the diversity handover base stations. Signal-to-interference ratio, carrier-to-interference ratio ($E_c/I_o$), bit error rate, and received signal strength are examples of signal qualities that may be measured. The mobile station transmits the signal quality measurements, including the received power levels from each of the diversity handover base stations (RxP1 and RxP2), to the radio network controller via the diversity handover base stations. Second, the diversity handover base stations each provide the radio network controller with its current transmit power level to the mobile station (TxP1 and TxP2). Third, the RNC determines a power offset from the reference power Pref for one or more of the diversity handover base stations, e.g., $\Delta 1$ and/or $\Delta 2$.

The RNC may determine the offset(s) based for example on which of the diversity handover base stations is the dominant or favored base station in the diversity communication. For example, if base station BS1 is determined to have the lower path loss (TxP1−RxP1), it might be deemed the dominant base station and be allocated a positive offset from Pref. That way the dominant base station provides a high quality radio link to support the mobile communication. The non-dominant base station BS2 in this example, having the higher path loss, might be allocated a negative offset from Pref to minimize its interference with other communications while still preserving diversity handover benefits. Of course, the identity of the dominant base station may change rapidly depending on the current transmission conditions. Other parameters may be used besides radio link power to assist in a calculation of power offset, e.g., decoded transmit power control commands from the mobile forwarded to the RNC.

Ultimately, when the diversity handover base stations receive their respective offsets (if any), each base station adds its individual offset to the broadcast power reference value Pref to arrive at a current target downlink power. The base station then adjusts its current power level to the target. Alternative ways to set the target power are of course possible. For example, the target power may be set by combining the individual offset Δ, the general target Pref, and a common control channel power, e.g., the common pilot channel for that base station. The use of pilot power may be useful if there are different size cells which suggest different pilot powers. Many power settings in the downlink may be set relative to pilot channel power.

In order to be able to selectively transmit different offsets to different base stations, the power offsets may be transmitted over a common control channel signalling link established between the RNC and base stations. Unlike an inserted control frame in the user data stream which is sent to all of the diversity handover base stations, common control channel signalling permits individual ones of the diversity handover base stations to be addressed. That way, different offsets may be addressed and delivered to different base stations. The cost of this selectivity is increased signalling overhead. However, that overhead is reduced by sending the offsets at a relatively low frequency, e.g., on the order of once per second, compared to the frequency at which the general reference power (Pref) is sent.

Figure 5C:
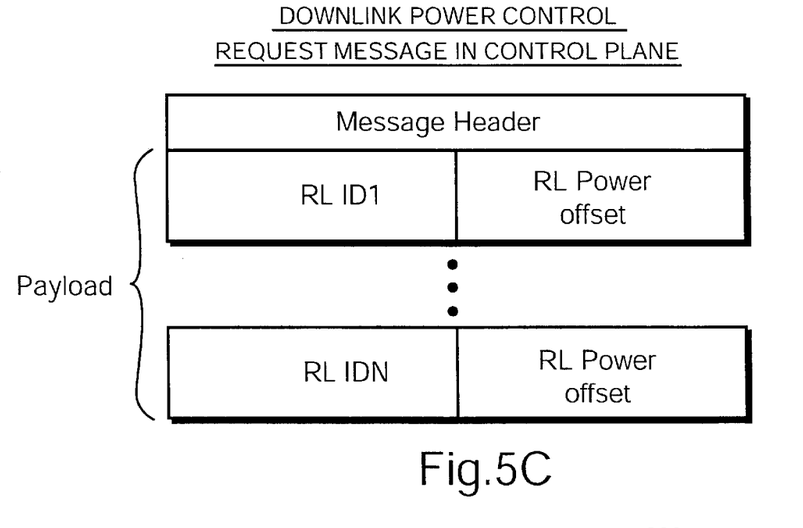
FIG. 5C shows an example control message that may be sent over a control signaling channel in a control plane.

FIG. 5C shows a non-limiting simplified example of a downlink power control request message in the control signalling plane between the RNC and each of the diversity handover base stations. The message includes a message header and a payload. The payload includes, among other things, a radio link or base station identifier and an associated power offset value. Such an identifier and offset are included for each of the diversity handover base stations to be offset from the reference power Pref, i.e., RL ID1/RL Power offset1 . . . RL ID2/RL Power Offset 2. The radio link identifier allows individual routing of the associated radio link power offset to the corresponding base station.

Figure 6:
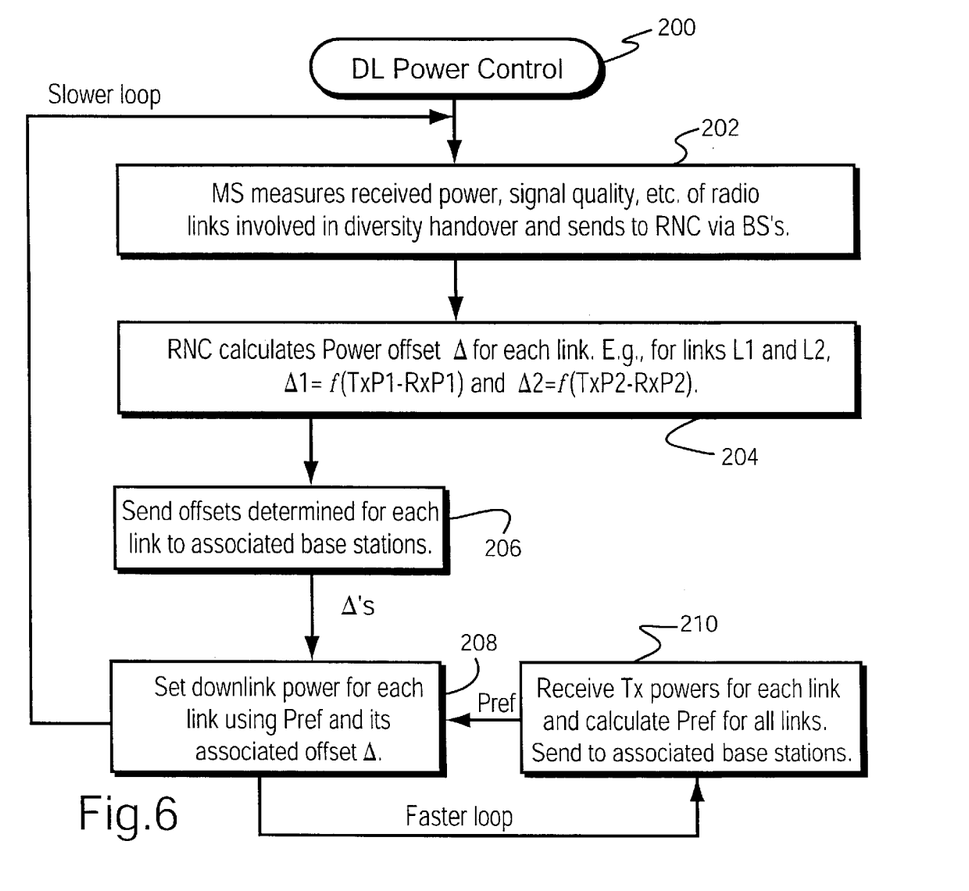
FIG. 6 is a downlink power control routine for in accordance with one example, non-limiting embodiment of the present invention.

FIG. 6 is a flow chart diagram (block 200) of one example showing parallel operation of the companion "fast" and "slow" diversity base station power control procedures. In the slower loop, the mobile station measures received power (or other signal quality parameter(s)) of the radio links involved in the diversity handover and sends those power measurements to the RNC via the diversity handover base stations (block 202). The RNC calculates a power offset for one or more of the diversity radio links (block 204). As described above, that power offset calculation may be function of the current radio link path loss or some other characteristic or parameter. The RNC then sends the determined offset(s) to the associated diversity handover base station(s) (block 206).

Turning to the "fast" loop, the RNC also receives the current transmit powers over the diversity radio links from each of the diversity handover base stations and calculates the reference power Pref to be used for all the diversity handover radio links (block 210). The general reference power (preferably determined at a higher frequency) for the diversity communication is combined with the individual offset (if any) for a specific one of the diversity handover base stations (preferably determined at a lower frequency) to set the target downlink power for that base station (block 208).

While the present invention has been described with respect to a particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Therefore, while the present invention is described in relation to preferred example embodiments, it is to be understood that this disclosure is only illustrative and exemplary of the present invention. Accordingly, it is intended that the invention be limited only by the scope of the claims appended hereto.

What is claimed is:

1. For use in a radio communications system, a power control method for controlling a transmit power from a first base station and from a second base station to a mobile station in a diversity handover of a communication involving the mobile station, comprising:

determining a reference power based on detected transmit power levels of the first and second base stations;

calculating a first power level difference for the first base station and a second power level difference for the second base station using the reference power;

adjusting at a first frequency at least one of the transmit power levels of the first and second base stations for the diversity handover communication using corresponding one of the first and second power level differences;

determining a power offset for at least one of the first and second base stations; and adjusting the power offset of the at least one base station at a second frequency lower than the first frequency.

2. The method in claim 1, wherein the power offset is determined based on measurements received from the mobile station.

3. The method in claim 2, wherein the measurements include the power at which each signal from the first and second base stations was received.

4. The method in claim 1, wherein the reference power is transmitted to the first and second base stations in a mobile station user data stream.

5. The method in claim 4, wherein the power offset is transmitted only to the one base station in a control signaling message.

6. The method in claim 4, wherein the reference power is transmitted as a control frame in the mobile station user data stream at the first frequency.

7. The method in claim 6, wherein the power offset is transmitted to the one base station at the second frequency.

8. The method in claim 7, wherein the first frequency is on the order of several to tens of transmissions per second and the second frequency is on the order of one or two transmissions per second.

9. The method in claim 4, further comprising:

determining a first power offset for the first base station and a second power offset for the second base station.

10. The method in claim 9, wherein the first offset is transmitted only to the first base station and the second offset is transmitted only to the second base station.

11. The method in claim 9, wherein the first and second offsets are transmitted at the second frequency.

12. The method in claim 9, further comprising:

controlling the transmit power of the first base station using the first power offset and the reference power, and controlling the transmit power of the second base station using the second power offset and the reference power.

13. The method in claim 12, wherein the first power offset and the reference power are used by the first base station to control the first base station transmit power, and the second power offset and the reference power are used by the second base station to control the second base station transmit power.

14. The method in claim 1, further comprising:

sending a first type of transmit power control message at the first frequency to the first and second base stations in a mobile station user data stream;

sending a second type of transmit power control message at the second frequency lower than the first frequency directed to one of the first and second base stations in a control frame identifying the one base station; and using the first and second messages to regulate an adjustment to the respective transmit power levels of the first and second base stations for the diversity handover communication to reduce a base station transmit power drift between first second base station transmissions to a mobile station in a diversity handover communication.

15. The method in claim 14, wherein the first type of transmit power control message includes the reference power.

16. The method in claim 14, wherein the second type of transmit power control message is the power offset value.

17. The method in claim 14, further comprising:

sending a second type of transmit power control message to the other of the first and second base stations in a control frame identifying the other base station.

18. For use in a radio communications system where a first base station and a second base station transmit to a mobile station in a diversity handover communication involving the mobile station, a radio network control node, comprising a controller configured to:

determine transmit power levels of the first and second base stations;

determine a reference power based on transmit power levels of the first and second base stations;

calculate a first power level difference for the first base station and a second power level difference for the second base station using the reference power;

adjust at a first frequency at least one of the transmit power levels of the first and second base stations for the diversity handover communication using corresponding one of the first and second power level differences;

determine a power offset for at least one of the first and second base stations; and adjust the power offset to the at least one base station at a second frequency lower than the first frequency.

19. The radio network control node in claim 18, wherein the controller is configured to determine the power offset based on measurements received from the mobile station.

20. The radio network control node in claim 19, wherein the measurements include the power at which each signal from the first and second base stations was received.

21. The radio network control node in claim 18, further comprising:

means for transmitting the reference power to the first and second base stations in a mobile station data frame.

22. The radio network control node in claim 18, further comprising:

means for transmitting the reference power as a control frame in a mobile station user data stream at the first frequency.

23. The radio network control node in claim 22, further comprising:

means for transmitting the power offset only to the at least one base station in a control signaling message.

24. The radio network control node in claim 23, further comprising:

means for transmitting the power offset to the at least one base station at the second frequency.

25. The radio network control node in claim 18, wherein the controller is further configured to determine a first power offset for the first base station and a second power offset for the second base station.

26. The radio network control node in claim 25, further comprising:

means for transmitting the first power offset only to the first base station and the second power offset only to the second base station.

27. The radio network control node in claim 18, wherein the controller is configured to:

control the transmit power of the first base station using the first power offset and the reference power, and control the transmit power of the second base station using the second power offset and the reference power.

* * * * *